No. 860,516. PATENTED JULY 16, 1907.
C. C. BERGH.
RAKE ATTACHMENT.
APPLICATION FILED MAY 14, 1906.

Inventor
Christian C. Bergh

Witnesses
By
Attorney

UNITED STATES PATENT OFFICE.

CHRISTIAN C. BERGH, OF ST. PAUL, MINNESOTA.

RAKE ATTACHMENT.

No. 860,516.  Specification of Letters Patent.  Patented July 16, 1907.

Application filed May 14, 1906. Serial No. 316,823.

*To all whom it may concern:*

Be it known that I, CHRISTIAN C. BERGH, a citizen of the United States, residing at 1360 Selby avenue, city of St. Paul, county of Ramsey, and State of Minnesota, have invented a new and useful Garden-Rake Attachment for Cleaning the Teeth of Garden-Rakes, of which the following is a specification.

This invention relates to improvements in garden rakes and more particularly to an attachment for devices of this class for cleaning the teeth thereof with ease and facility.

The improved rake attachment consists of a cleaning member or bar movable vertically over the inner portions of the rake teeth, and operative from the handle of the rake, the cleaning member or bar being of a particular construction and readily applicable to any rakes now in use without requiring a material modification of the organization of the same.

Figure 1:
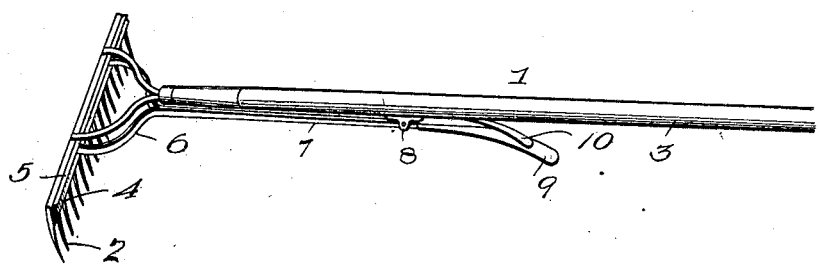
Figure 2:
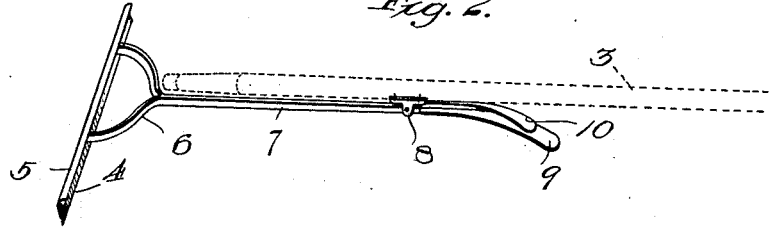
Figure 3:
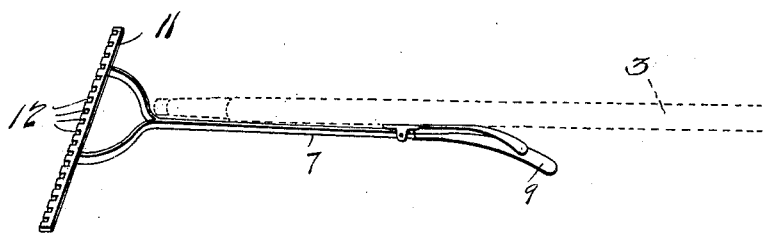

In the drawing, Figure 1 is a perspective view of a garden rake embodying the features of the invention. Fig. 2 is a detail perspective view of the cleaning member or bar. Fig. 3 is a detail view of a modified form of the cleaning member or bar.

Similar reference characters indicate corresponding parts throughout the several views.

Referring to the drawings, the numeral 1 designates an ordinary rake head having teeth 2 and a handle 3. Against the inner portions of the rake teeth 2 a cleaning member or bar 4 is movably applied and has an upper bent head 5. The member or bar is held by braces or arms 6 extending from the forward end of an operating lever 7 fulcrumed on the rake handle 3 as at 8 and provided with a rear terminal grip or hand engaging extremity 9. Between the rake handle 3 and the lever 7, a spring 10 is interposed to return the attachment to normal position when released.

The operation of the attachment as thus far described is very simple and by exerting a pressure on the rear extremity of the lever 7 against the resistance of the spring 10 the cleaning member or bar will be caused to move over the rake teeth 2. After the lever is released the cleaning member or bar immediately springs upwardly in a normal position so as not to interfere with the rake in performing its usual functions.

The modification shown by Fig. 3 consists in providing the cleaning member or bar 11 with a plurality of notches 12 to embrace the rake teeth and thus produce projections which extend between the teeth. The operation of this modified form and the means for supporting the same in connection with the rake handle are the same as in the construction shown by Figs. 1 and 2.

The improved attachment will be found exceptionally useful and variations in the dimensions and proportions may be adopted without departing from the spirit of the invention.

What I claim is:

The combination with a toothed rake, of a cleaning member having an upper, angular edge and a lower straight edge bearing closely against the inner sides of the teeth, the said cleaning member being constructed from a single piece of material, an operating lever connected to the said member and fulcrumed against the handle of the rake, the rear end of said lever being projected away from the handle of the rake, and a spring interposed between the rear end of the lever and the rake handle.

CHRISTIAN C. BERGH.

Witnesses:
CHAS. S. HOFF,
W. E. BARNACLE.